US008923686B2

(12) United States Patent
Krishnaswamy

(10) Patent No.: US 8,923,686 B2
(45) Date of Patent: Dec. 30, 2014

(54) DYNAMICALLY CONFIGURABLE 3D DISPLAY

(75) Inventor: Ravi Srinivasan Krishnaswamy, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 846 days.

(21) Appl. No.: 13/112,888

(22) Filed: May 20, 2011

(65) Prior Publication Data

US 2012/0293513 A1 Nov. 22, 2012

(51) Int. Cl.
*H04N 5/92* (2006.01)
*H04N 5/89* (2006.01)
*H04N 9/88* (2006.01)
*H04N 5/93* (2006.01)
*G11B 27/00* (2006.01)
*H04N 13/00* (2006.01)
*H04N 15/00* (2006.01)

(52) U.S. Cl.
CPC ........... *H04N 13/004* (2013.01); *H04N 13/007* (2013.01)
USPC ........... 386/326; 386/336; 386/271; 386/278; 348/42; 348/50; 348/51

(58) Field of Classification Search
USPC ......................... 386/326, 336; 345/42, 50, 51
See application file for complete search history.

(56) References Cited

U.S. PATENT DOCUMENTS

| 5,682,196 | A | 10/1997 | Freeman |
| 6,147,678 | A | 11/2000 | Kumar et al. |
| 6,154,723 | A | 11/2000 | Cox et al. |
| 6,181,343 | B1 | 1/2001 | Lyons |
| 6,229,542 | B1 * | 5/2001 | Miller .......................... 715/782 |
| 6,353,436 | B1 | 3/2002 | Reichlen |
| 7,058,204 | B2 | 6/2006 | Hildreth et al. |
| 7,126,579 | B2 | 10/2006 | Ritter |

(Continued)

FOREIGN PATENT DOCUMENTS

| EP | 2624571 A2 | 8/2013 |
| WO | WO 03/083822 | 10/2003 |
| WO | 2009083863 A1 | 7/2009 |

OTHER PUBLICATIONS

Gesturetek, "GestPoint® Gesture Recognition for Presentation Systems", 2011, 3 pages.

(Continued)

*Primary Examiner* — Daquan Zhao
(74) *Attorney, Agent, or Firm* — Ingrassia Fisher & Lorenz, P.C.

(57) ABSTRACT

Methods, systems and computer program products provide a dynamically configurable 3D display utilizing a content receiver. The content receiver generates the 3D content with an offset that enables the images to be viewable in a plurality of 3D regions, where each 3D region and images therein are perceived as having a different degree of depth relative to other images within 3D regions. The user viewing the 3D content may interact with the 3D content through a sensor device communicatively coupled to the content receiver that senses user movements and transmits signals to the content receiver for taking some action in response to the user's movements, including moving the 3D content between various 3D regions. 3D content in a foreground 3D region may be partially transparent to enable viewing of underlying 3D content in a background 3D region. 3D content may include a 3D user interface enabling the user to enter selections.

20 Claims, 8 Drawing Sheets

(56) References Cited

U.S. PATENT DOCUMENTS

| | | | |
|---|---|---|---|
| 7,511,710 | B2 | 3/2009 | Barrett |
| 7,682,250 | B2 | 3/2010 | Ikebata et al. |
| 7,839,385 | B2 | 11/2010 | Hunleth et al. |
| 8,150,238 | B2 * | 4/2012 | Sasaki et al. ............ 386/337 |
| 8,565,485 | B2 * | 10/2013 | Craig et al. ............ 382/103 |
| 2004/0046736 | A1 | 3/2004 | Pryor et al. |
| 2007/0266411 | A1 * | 11/2007 | Yamamoto et al. ......... 725/88 |
| 2008/0068376 | A1 | 3/2008 | Anderson |
| 2009/0077504 | A1 | 3/2009 | Bell et al. |
| 2010/0007582 | A1 * | 1/2010 | Zalewski ............ 345/8 |
| 2010/0009308 | A1 | 1/2010 | Wen et al. |
| 2010/0060722 | A1 | 3/2010 | Bell |
| 2010/0207880 | A1 | 8/2010 | Shaver et al. |
| 2010/0234094 | A1 | 9/2010 | Gagner et al. |
| 2011/0012830 | A1 | 1/2011 | Yeh |
| 2011/0012896 | A1 | 1/2011 | Ji |
| 2011/0032187 | A1 | 2/2011 | Kramer et al. |
| 2011/0032330 | A1 | 2/2011 | Kim et al. |
| 2011/0074918 | A1 | 3/2011 | Klappert et al. |

OTHER PUBLICATIONS

Grossman, et al., "Multi-Finger Gestural Interaction with 3D Volumetric Displays," University of Toronto, UIST, Oct. 24-27, 2004, 10 pages.

Karam, et al., "A Taxonomy of Gestures in Human Computer Interactions," Technical Report ECSTR-IAM05-009, Electronics and Computer Science, University of Southampton, Nov. 2005, pp. 1-45.

Marshall, et al., "Virtual Sculpture—Gesture-Controlled System for Artistic Expression," University of Limerick, Ireland, downloaded from http://www.marktmarshall.com/_media/writings/virtualsculpture.pdf, 2004, 6 pages.

European Patent Office, Examination Report, dated Dec. 12, 2013 for European Patent Application No. 12168738.8.

European Patent Office, Extended European Search Report for European Patent Application No. 12168738.8, mailed Apr. 17, 2013.

* cited by examiner

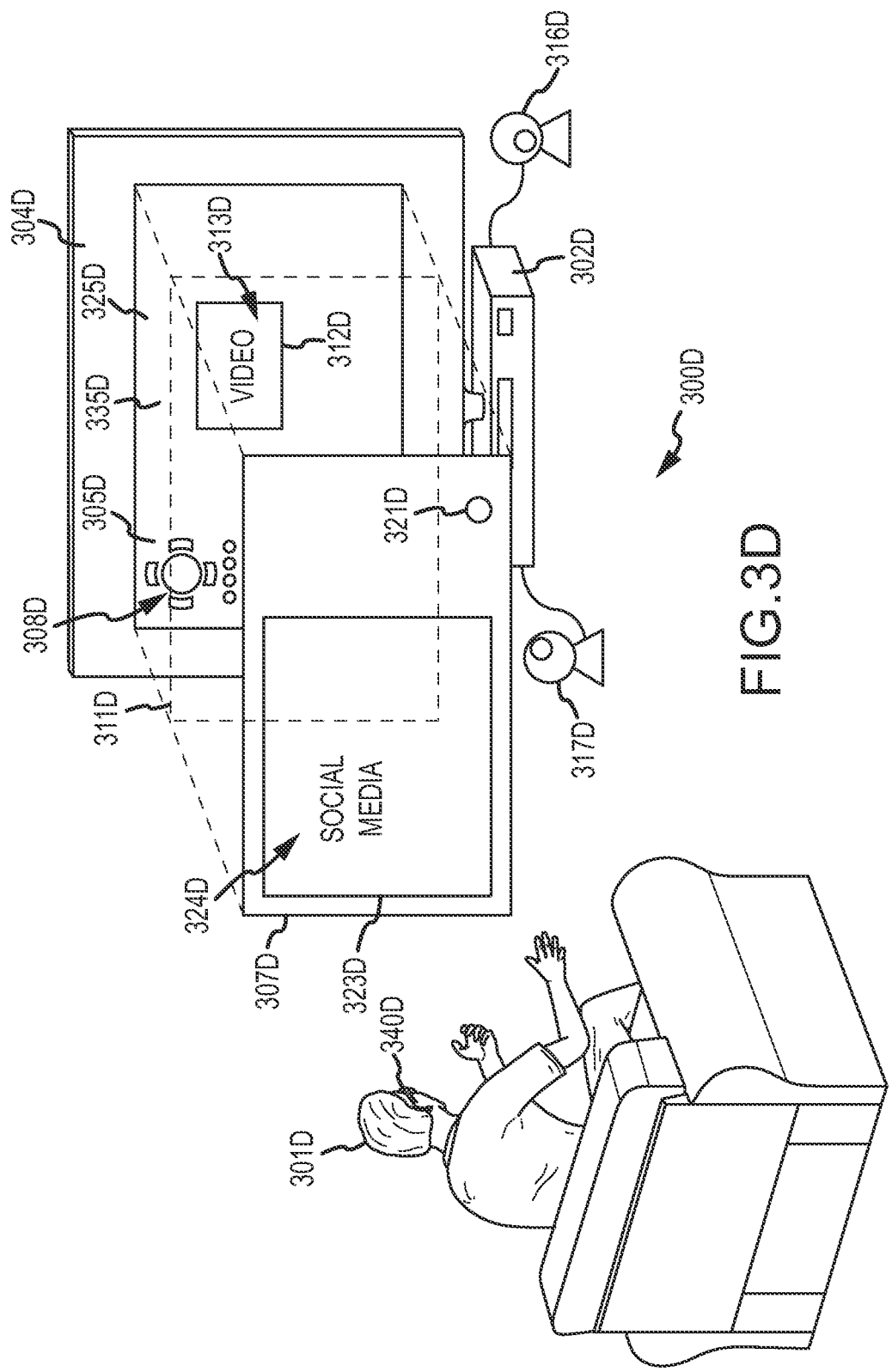

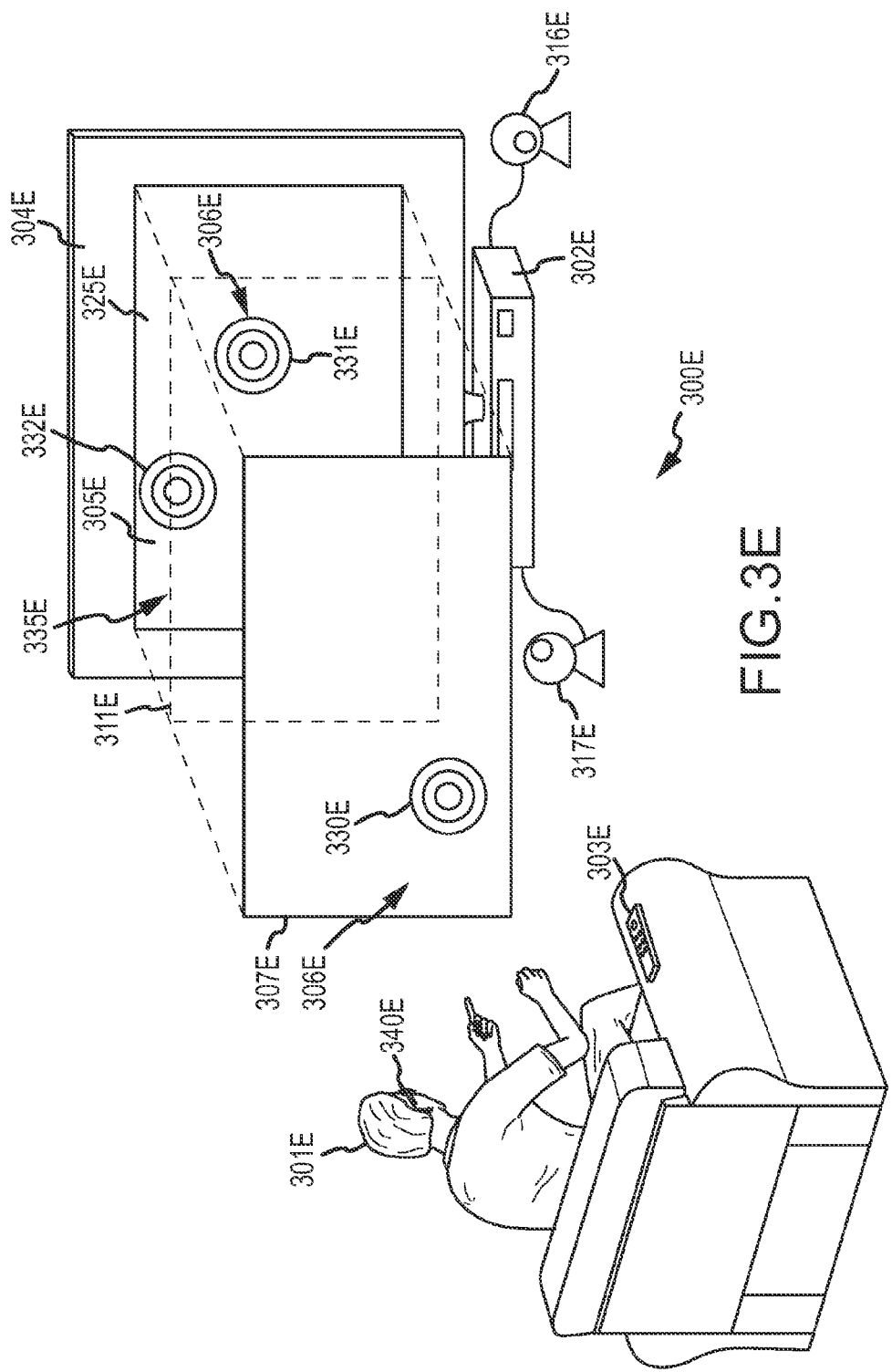

DYNAMICALLY CONFIGURABLE 3D DISPLAY

FIELD OF THE INVENTION

This disclosure relates generally to generating dynamically configurable three-dimensional ("3D") displays utilizing content receivers that may enable users to interact with the 3D display.

SUMMARY

Systems, methods and computer program products utilize a content receiver to generate a dynamically configurable 3D display. The content receiver configures the 3D content so that the 3D content is viewable in a plurality of 3D regions. The 3D regions are virtual regions projecting from a display screen of the content display device, each region having a different degree of perceived depth. The user viewing the 3D content perceives the 3D content within each region, and at least two of the 3D regions are perceived as being spaced apart from each other. The content receiver is communicatively coupled to a sensor device (such as a camera, IR sensor, or other motion sensor) that senses user movements and transmits signals to the content receiver for taking some action in response to the user's movements. In some implementations, in response to user movements, the content receiver takes action by moving the 3D content from one region to another. This enables the user to interact with the virtual 3D regions, for example, to move the 3D content forward and backward relative to the user's body or relative to the display screen of the content display device (such as a 3D television). The 3D content may also be moved by the user interacting with the 3D regions so that the 3D content is moved from side-to-side, up-and-down, diagonally and/or generally about the region. The 3D content provided by the content receiver may include 3D video content and 3D on screen display content (such as a 3D user interface, 3D programming guide, 3D user applications such as social networking applications, e-mail, websites and so on).

In one implementation, a method provides a dynamically configurable 3D display utilizing a content receiver. The method includes utilizing a content receiver to generate 3D content where the 3D content is formed of a first set of 3D content with a first offset and a second set of 3D content with a second offset different from the first offset. The content receiver transmits the 3D content for display at a content display device such that the first set of 3D content is perceived as being within a first 3D region having an associated first perceived depth and the second set of 3D content is perceived as being within a second 3D region having an associated second perceived depth different from the first perceived depth. Command signals received at the content receiver signal modification of at least one of the first set and the second set of 3D content. The content receiver transmits at least one of the first and the second set of 3D content to the content display device such that at least one of the first offset and the second offset is changed thereby changing the 3D region in which the one of the first and second set of 3D content is perceived.

In another implementation, a system includes a content receiver that provides a dynamically configurable 3D display. The content receiver includes a processing unit configured to generate 3D content for a plurality of 3D regions, where the 3D content includes a first set of 3D content with a first offset. A communications unit provided by the content receiver transmits the 3D content for display at a content display device such that the first set of 3D content is perceived as being within a first region of the plurality of regions having an associated first perceived depth. The communications unit is configured to receive command signals from a sensor device communicatively coupled to content receiver, and the sensor device senses user movements and transmits data corresponding to command signals to the communications unit. The processing unit modifies the first set of 3D content in response to the command signals such that the processing unit configures the first set of 3D with a second offset different from the first offset, and the communications unit transmits the first set of 3D content such that the first set of 3D content is perceived as being within a second 3D region having an associated second perceived depth that is different from the first 3D region having the first perceived depth.

In another implementation, a computer program product includes instructions stored in at least one non-transitory machine readable medium, executable by at least one processing unit for providing a dynamically configurable 3D display. A first set of instructions generates 3D content that includes a first set of 3D content comprising a first offset. A second set of instructions causes the transmission of 3D content for display at a content display device such that the first set of 3D content is perceived by a user as being within a first 3D region having an associated first perceived depth. A third set of instructions modifies the first set of 3D content in response to receiving command signals from a sensor device that senses user movements. Modifying the first set of 3D content involves configuring the first set of 3D with a second offset different from the first offset so that the first set of 3D content is perceived as being within a second 3D region having an associated second perceived depth that is different from the first 3D region having the first perceived depth.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIGS. 3A-3E are diagrams illustrating a system for providing a 3D display and receiving input therefrom utilizing a content receiver. The system may be the system of FIG. 1.

DETAILED DESCRIPTION OF THE EMBODIMENTS

Figure 1:
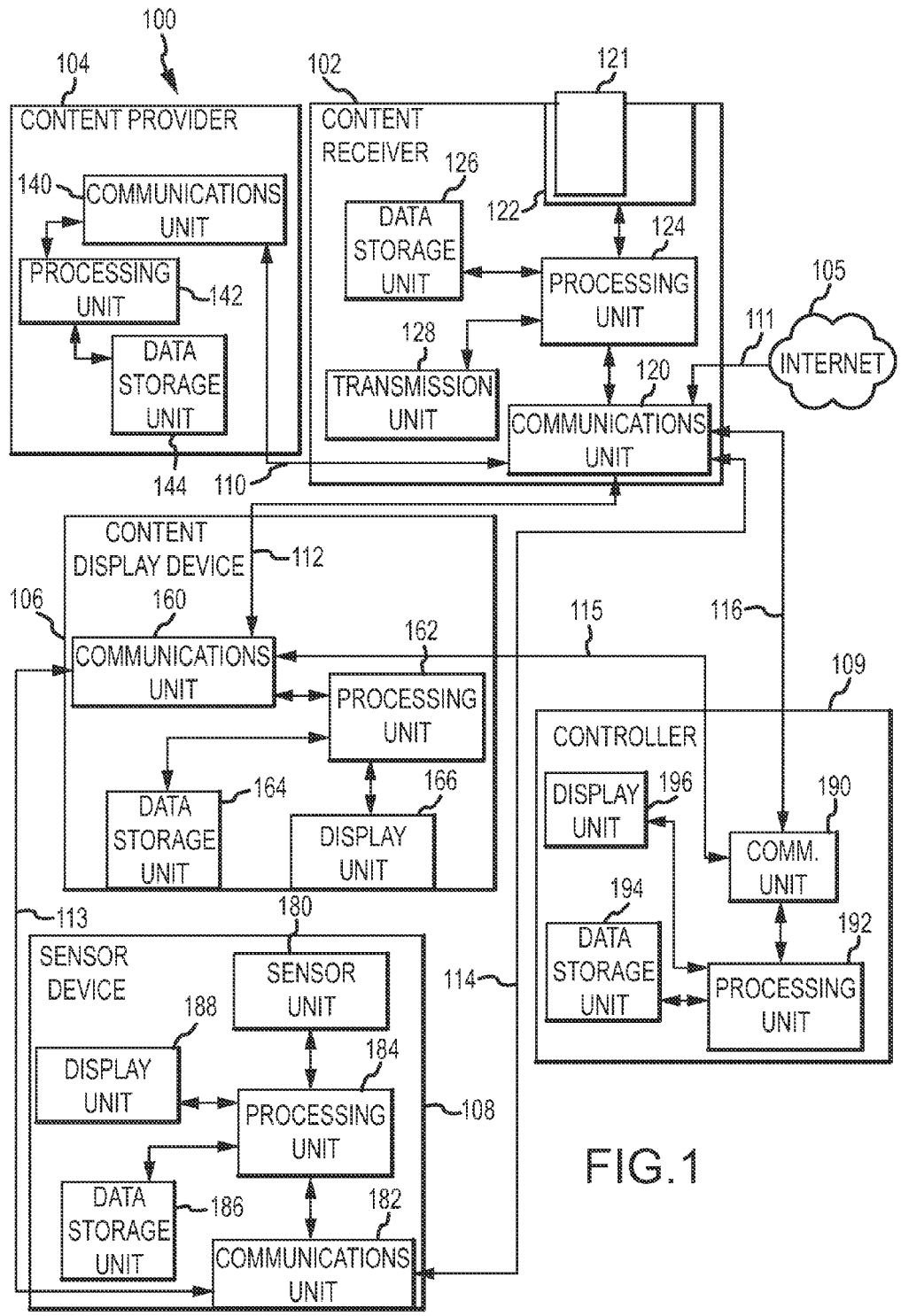
FIG. 1 is a block diagram illustrating a system for providing a 3D display and receiving input therefrom utilizing a content receiver.

The description that follows includes sample systems, methods, and computer program products that embody various elements of the present disclosure. However, it should be understood that the described disclosure may be practiced in a variety of forms in addition to those described herein.

Electronic devices such as content receivers (like set top boxes) generally receive content from a content stream and decode and transmit the video, audio and data content from the content stream to a content display device (such as a television). Some content display devices are capable of projecting the content to a display screen in a way such that the images displayed are perceived by the user as a three-dimensional ("3D") image with depth. The perception of a 3D image projecting from the display screen is due to the content receiver transmitting content as a first image and a second image, such as a left image and a right image or as a top image and a bottom image, each of which are generally offset (such as arranged adjacent, side-by-side, left and right, and top and bottom) from one another, which (generally with the aid of 3D glasses) results in the human eye perceiving the two images as one image projecting out from the display screen of a 3D content display device (such as a 3D television). For purposes of discussion, only the first image and the second image are described in connection with 3D imaging, but it will be understood that a left or top image or a right or bottom image may be thought of as being interchangeable with the term first image and that the other of the right or left or top or bottom image may be thought of as interchangeable with the term second image. The 3D image displayed as the first image and the second image may be generated from a two-dimensional image ("2D") utilizing hardware resident in the content receiver box, or the content receiver may receive content formatted into 3D, i.e., split into left and right images. For example, a video player (e.g., a DVD player) or a content provider (e.g., satellite cable company) may transmit a content stream to the content display device in a 3D format.

Some 3D images may correspond to selections available to the user. Upon selecting the 3D image, an action may be taken by a content receiver communicatively coupled to a content display device. For example, a user viewing the 3D images may utilize a controller (such as a remote control) to enter selections. In some cases, the user may utilize a portion of their body to interact with the 3D images to enter selections. However, the user generally interacts with the 3D image in a single virtual plane or region.

The present disclosure discloses systems, methods and computer program products for utilizing a content receiver to generate a 3D display including a plurality of 3D virtual planes or regions, and the 3D display may be dynamically modifiable based on user interactions with the plurality of 3D virtual planes or regions.

In some implementations, the arrangement, size and/or shape of the 3D content may be changed from one 3D region to another 3D region based on a user's interactions with the virtual planes or regions. For example, the 3D virtual planes or regions may be utilized to enter a selection (from a controller or by utilizing one or more portions of the user's body), and in response, the content receiver may transmit the 3D content to a different 3D regions thereby resulting in a changed view of the 3D content. The user's body interactions with the virtual 3D planes or regions of the 3D display may involve the user's moving body parts, such as their hands, head and/or feet. For example a sensor device (such as one or more cameras) may be utilized to sense the user's body movement, and when the sensed movement is determined to be input (such as a selection or a command), the content receiver transmits the 3D content for display in at least one of the 3D planes or regions based on the input.

In some implementations, the content receiver may be configured to transmit 3D content such as 3D video content and 3D on screen display content (e.g., a 3D user interface, 3D programming guide, 3D applications (such as social media or networking applications, e-mail, websites)) and the 3D content may be perceived as being arranged within the multiple 3D planes or regions. A number of sensors may sense a user's movements, which may be correlated with interacting with one or more 3D planes or regions having associated 3D content displayed therein. In response, the content receiver may transmit the 3D content so that it moves between the multiple virtual planes or regions (e.g., forward or towards the display screen or backward or away from the display screen), changes position within the same virtual plane (e.g., from side-to-side, up-and-down, diagonally, and so on), or moves to another virtual plane or region and changes position compared to the original virtual plane or region.

In addition or alternatively, the 3D content in one 3D plane or region may be transmitted as an overlay to other 3D content in another 3D plane or region. For example, the 3D video content may be transmitted for display across nearly the entire display screen, and therefore across nearly an entire corresponding 3D virtual plane or region of a content display unit (such as a 3D television), and the 3D on screen display content (such as a user interface) may be transmitted in another 3D plane or region as an overlay to the 3D video content. The overlaying 3D content may be opaque so that the underlying 3D content is obscured. Alternatively, the overlaying 3D content may be partially transparent enabling the underlying 3D content to be viewed. The partially transparent 3D content may be transmitted so that a portion of the 3D content data is utilized by the content receiver and transmitted to the content receiver. For example, the transmitted portion of the 3D content may result in the 3D content being 20 percent to 80 percent transparent (e.g., with a pixelated or cloudy appearance), enabling the underlying 3D content to be perceptible.

In implementations where the 3D content is moved between multiple virtual planes, the overlaying 3D content may be transmitted such that it is opaque or partially transparent. In some implementations, the content receiver automatically transmits the overlaying 3D content as partially transparent based on predefined settings (e.g. content provider settings) or user settings. For example, where the 3D on screen display content is a 3D user interface, and when the 3D user interface overlays other 3D content, the 3D user interface may be transmitted as partially transparent to enable the underlying 3D content (such as 3D video content) to be viewed.

FIG. 1 is a block diagram illustrating a system 100 that utilizes a content receiver to transmit 3D content and receive inputs based on interactions with the transmitted 3D content. The system 100 includes a content receiver 102 (such as a set top box) for receiving and transmitting content (such as 3D television programming and 3D on screen display content), a content provider 104 (such as a satellite or cable programming service provider) for transmitting the content, an Internet or a network connection 105, a content display device 106 for receiving and displaying the content (such as a 3D television), sensor device 108 (such as a camera) for sensing a user's interactions, and an optional controller 109 (such as a remote control) for transmitting data such as control signals to the content receiver 102. While not shown, the system 100 may include a wearable viewing device such as 3D glasses communicatively coupled to the content receiver 102 to enable the user to view content in a 3D format.

The content receiver 102 is a device for receiving content from the content provider 104 and other external sources, for processing or decoding the content and for transmitting the content to the content display device 106. The content receiver 102 is, for example, a set top box, a television receiver, a digital video recorder, a computing device, a gaming device, or a television. The content receiver 102 is generally located at a user's location (such as a user's residence or business). The content receiver 102 is operable to receive 2D and 3D content from the content provider 104 (and/or another external source) by way of the transmission link 110, and is operable to receive 2D and 3D content from the Internet or network 105 by way of transmission link 111. Such content is received by the communications unit 120 of the content receiver 102. The content receiver 102 is also operable to receive 2D or 3D content from an external source 121 by way of data port 122 (e.g., USB port). For example, the data port 122 may be a USB port connectable to a flash drive, a mobile computing device such as a phone (e.g., a smart phone and/or a camera phone), a digital tablet, and the like having 2D or 3D content data stored therein. The data from the content provider 104 and the external source 121 is provided to the processing unit 124 for executing instructions stored in the data storage unit 126 and for providing content to the content display device 108 and/or to audio speakers via the transmission unit 128. In another example, the external source 121 may be a 3D DVD and/or a 3D DVD player. The processing unit 124 is configured to transmit content in a 3D format, and may transmit the 3D content across multiple virtual planes or regions, may alter the positioning and/or arrangement (e.g., size and/or shape) of the 3D content within the virtual planes or regions, may provide 3D content as a partially transparent or opaque overlay to other 3D content, and so on. The processing unit 124 may also receive input from a user based on movements by the user, based on commands sent from the controller 109 or both.

The content provider 104 (such as a satellite programming company, a cable company, an Internet service provider, e.g., an online video service or Internet video provider, and the like) is generally remotely located from the content receiver 102. The content provider 104 utilizes a communications unit 140, a processing unit 142 and a data storage unit 144 to receive, manage and store content, which is transmitted at least in a 3D format, but may also be transmitted in 2D format, by the communications unit 140 to the communications unit 120 of the content receiver 102 via the transmission link 110.

The content display device 106 is generally arranged proximate to and is communicatively coupled to the content receiver 102 and displays 2D and 3D content. While the content display device 106 and the content receiver 102 are depicted as separate components in FIG. 1, it will be appreciated that the content receiver 102 may be incorporated with the content display device 106. The content display device 106 is, for example, a 3D television, a 3D computer screen, a 3D video screen, or any other 3D display device for displaying 3D content or 3D images capable of being perceived by a user as having depth. The content display device 106 includes a communications unit 160, which receives 2D and 3D content from the communications unit 120 of the content receiver 102 by way of the transmission link 112. The content display device 106 also includes a processing unit 162 for executing instructions stored in a data storage unit 164 and a display unit 166 for displaying 2D and 3D content received from the content receiver 102.

The sensor device 108 is generally provided in an area proximate the content display device 106 and is communicatively coupled thereto by way of the transmission link 113. The sensor device 108 is also communicatively coupled to the content receiver 102 by way of the transmission link 114. The sensor device 108 is, for example, a camera, an IR sensor a motion sensor and so on. The sensor device 108 includes a sensor unit 180 for sensing movements, a communications unit 182 for sending and receiving information, a processing unit 184 for executing instructions stored in a data storage unit 186, and an optional display unit 188 for displaying or presenting information stored within the data storage unit 186 such as images captured by the sensor unit 180 as well as information generated by the processing unit 184. The sensor unit 180 may be configured to sense movements of the user positioned within a sensing region of the sensor unit 108. The sensor device 108 includes instructions stored in the data storage unit 186 for detecting movements and/or determining the type of input associated with the movements. The sensor device 108 transmits the movement data via the communications unit 182 to the communications unit 120 of content receiver 102 by way of the transmission link 114.

The optional controller 109 is generally provided in an area proximate the content receiver 102 and is communicatively coupled to the content display device 106 by way of the transmission link 115 and to the content receiver 102 by way of the transmission link 116. The controller 109 is, for example, a remote control, such as a universal remote control, a dedicated remote control, or a computing device programmed to send command signals to the content receiver 102. The controller 109 includes a communications unit 190 for sending and receiving information, a processing unit 192 for executing instructions stored in a data storage unit 194, and an optional display unit 196 for displaying or presenting information stored within the data storage unit 194 such as information related to a command sent to the content receiver 102. The controller 109 may be utilized to navigate and select information displayed on the expanded programming guide and magnified regions, described further below.

Returning to the content receiver 102, the processing unit 124 executes instructions stored in the data storage unit 126 for generating and transmitting 3D on screen display content (such as a programming guide) and for transmitting 3D video content.

The processing unit 124 may generate 3D content corresponding to a plurality of 3D regions, such as a front 3D region, middle 3D region and back 3D region, where each successive region is perceived as being closer to the display screen of the content display device. The display screen itself may show 2D content, while at the same time projecting 3D content in the various regions, and thus a 2D region may be provided in some implementations.

The 3D content within each of the 3D regions includes a set of 3D content with an offset as determined and/or generated by the processing unit 124. That is, 3D content is generally transmitted as polarized images half intended for the left eye and half for the right eye, and the degree of offset of the left eye and right eye images determines the degree of perceived depth of the 3D content. Accordingly, the degree of offset for each 3D region is different based on the operations of the processing unit 124, thereby providing a differing degree of perceived depth for each 3D region. For example, a first 3D region may include 3D content with a first offset, a second 3D region may include 3D content with a second offset different from the first offset, a third 3D region may include 3D content with a third offset different from the first and second offset and so on.

The processing unit 124 transmits the 3D content to the content display device 106 for display on the display unit 166 and each of the regions including 3D content is perceived as having differing degrees of depth. For example, the first set of 3D content is perceived as being within a first region with an associated first perceived depth, the second set of 3D content is perceived as being within a second region having an associated second perceived depth different from the first and so on. At least two of the regions are perceptible by the user as being spaced by some distance. This may enable the content receiver to modify the various sets of 3D content by dynamically mastering or adjusting the offset distance between the images. For example, the user may interact with the 3D content (e.g., 3D images) within each region utilizing the movements as input, the content receiver may move the 3D content between regions and/or within regions, described below. In some implementations, the 3D content within the regions may generally move within the region, such as in response to a user's gesture, the 3D content within each region may remain in the region until the processing unit receives 124 some input to modify the arrangement of the 3D content within the regions.

The processing unit 124 may receive input commands (such as via user movements or via the controller 109) to change the offset of the 3D content within one of the regions in order to changing the perception of depth of at least one of the first and the second set of 3D content. This gives the user the perception that the 3D content has moved in space to another region. For example, the processing unit 124 may initially transmit a first set of 3D content in a front 3D region and a second set of 3D content in a background 3D region behind the front 3D region. Subsequently, the processing unit 124 may transmit at least a portion of the first set of 3D content from the front 3D region in the background 3D region, which changes the user's perception of depth for at least a portion of the first set of 3D content. For example, in response to the processing unit 124 changing the offset of the initially transmitted 3D content, both the first set and second set of 3D content may be perceived as having the same depth. Thus, the sets of 3D content may be perceived as being within the same region. In some implementations, the 3D content within the same region is arranged side-by-side or may be overlapping (e.g., overlaying 3D content). In cases where the sets of 3D content overlap, one or more of the sets may be transmitted as partially transparent 3D content to enable the underlying 3D content to be viewed. In further implementations, the 3D content within regions reverses positions so that 3D content in a front 3D region moves to a background or middle 3D region and 3D content in the middle or background 3D region is moved to the front 3D region. This reversed position of the 3D content may be the result of the processing unit 124 reversing the assigned offsets for the sets of 3D content.

Providing 3D content in various 3D regions may be useful in cases where 3D video and 3D on screen display content is viewed simultaneously. All or a portion of the 3D video may be viewed in one or more regions, while all or a portion of the 3D on screen display content may be viewed in one or more regions, which may differ from the regions associated with the 3D content. In some implementations, the 3D on screen display content is a 3D user interface that enables the user to interact with the 3D user interface, which may include 3D icons or command buttons. Where the 3D user interface is arranged in an overlaying region (e.g., a front 3D region), the processing unit 124 may transmit the 3D user interface as partially transparent 3D content such that underlying content (such as 3D video content) is perceived behind the partially transparent 3D user interface.

In certain implementations, the processing unit 124 receives command signals based on sensed input from the sensing device 108 configured to sense user movements. In this implementation, the processing unit 124 may be communicatively coupled to the sensor unit 180 of the sensor device 108 and may receive input based on user movements sensed by the sensor unit 180. Such body movements sensed by the sensor unit 180 may include hand gestures that may be converted into signals by the sensor unit 180 that are subsequently received as input by the processing unit 124 of the content receiver 102. For example, a hand gesture (such as a side-to-side, up-and-down or diagonal hand movement) may cause the 3D content to move in a corresponding manner. A fast moving gesture or a throwing gesture may cause 3D content to move off of or no longer be transmitted to the content display device 106 (e.g., to disappear). The user may also change the size of the 3D content by moving their hands apart or closer together.

In some implementations, the processing unit 124 transmits prompts to the display unit 166 of the content display device 106 prompting the user to interact with the sensor device 108 so that the processing unit 124 receives input from the sensor device 108 to generate an interaction map of the user's movements. For example, the prompts may be in the form of 3D images the user virtually touches with a portion of their body. The sensor unit 180 senses the user's movements and the processing unit relates the sensed information to the 3D images transmitted and generates an interaction map. Utilizing the interaction map, the processing unit 124 receives selections from the user interacting with the 3D content displayed and in response, the processing unit 124 takes action.

The sensor device 108 enables the user to interact with the 3D content displayed in the various 3D regions. In some implementations, the user moves the 3D content between regions by gesturing with their body. For example, a 3D user interface may be moved from a background 3D region to a front 3D region by user hand movements. During such an operation, 3D video content may be statically arranged within a 3D region or may move in response to movement of the 3D user interface or in response to the user's gestures.

In implementations where the processing unit 124 transmits a 3D user interface to the display unit 166 of the content display device 106, the processing unit 124 may configure the 3D user interface to enable the processing unit 124 to receive user selections or command signals in response to sensed input from the sensor unit 180 configured to sense user movements associated with interacting with the 3D user interface. For example, the user may gesture in a way that simulates pressing an icon or a button of the 3D user interface. In implementations where the processing unit 124 transmits a 3D programming guide, user selections may be entered in response to sensed input from the sensor unit 180. For example, programming selection may be entered by the user's gestures, which may include changing the channel, playing a video, recording a programming event and so on.

Figure 2A:
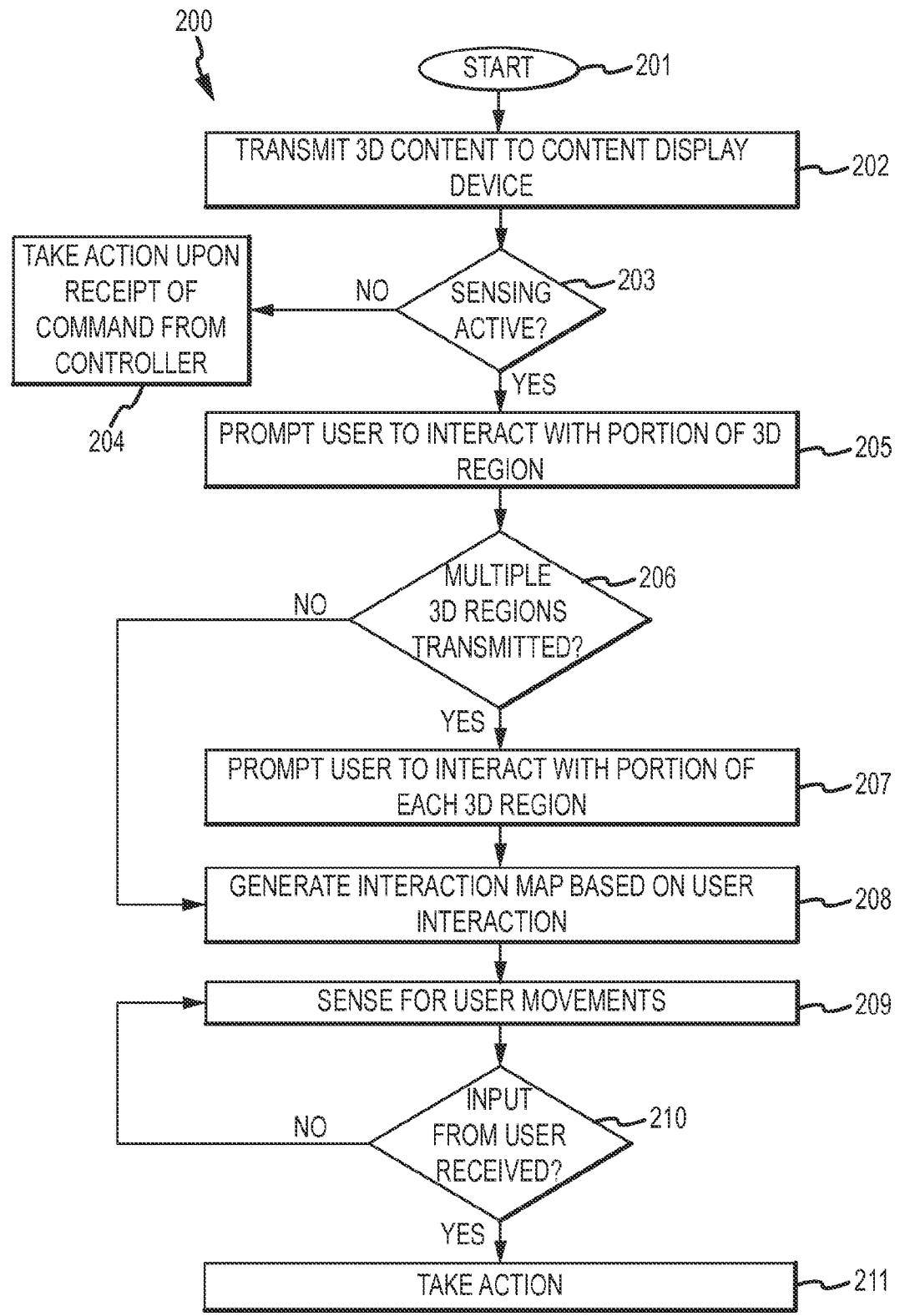
FIGS. 2A-2B are flow charts illustrating methods for providing 3D display utilizing a content receiver. These methods may be performed by the system of FIG. 1.

FIG. 2A illustrates a method 200 for transmitting a 3D display and receiving inputs based on selections made from the 3D display utilizing a content receiver. The method 200 may be performed by the system 100 of FIG. 1. The flow begins at block 201 and proceeds to block 202 where 3D content is transmitted to the content display device 106. The flow then proceeds to block 203 where the processing unit 124 determines whether sensing (such as motion sensing) is active. If sensing is not active, the flow proceeds to block 204 where the processing unit 124 takes action upon input commands from the controller 109. If sensing is active, the flow proceeds to block 205 where the user is prompted to interact with a portion of the 3D region displayed by the content display device 106. For example, the interaction may be sensed by the sensor unit 180 of the sensor device 108 (such as a camera, IR sensor or other motion sensor). The flow may then proceed to block 206 where the processing unit 124 determines whether multiple 3D regions are transmitted. If not the flow proceeds to block 208. If so, the flow proceeds to block 207 where the processing unit 124 transmits a prompt to the content display device 106 prompting the user to interact with a portion of each of the 3D regions displayed. The flow then proceeds to block 208 where an interaction map is generated by the processing unit 124 based on the user's sensed interactions with the virtual 3D region(s). The flow then proceeds to block 209 where the sensor unit 180 is active for sensing user movements. The flow then proceeds to block 210 where the processing unit 124 determines whether input from user movements has been received by the sensor unit 180. If not, the flow returns to block 209 where the sensor unit 180 is active for sensing user movements. If input from user movements is received at the processing unit 124, the flow then proceeds to block 211 where the processing unit takes action.

The action taken may be based on the type of user movement (e.g., a side-to-side, forward/backward, up-and-down movement), and/or the position in relation to the 3D content displayed at which the use's movement is sensed. For example, the processing unit 124 may take actions related to programming or video content such as changing the channel, playing a video, recording a programming event and so on. In another example, and described further below, the processing unit 124 may move the 3D content from one 3D plane or region to another.

Figure 2B:
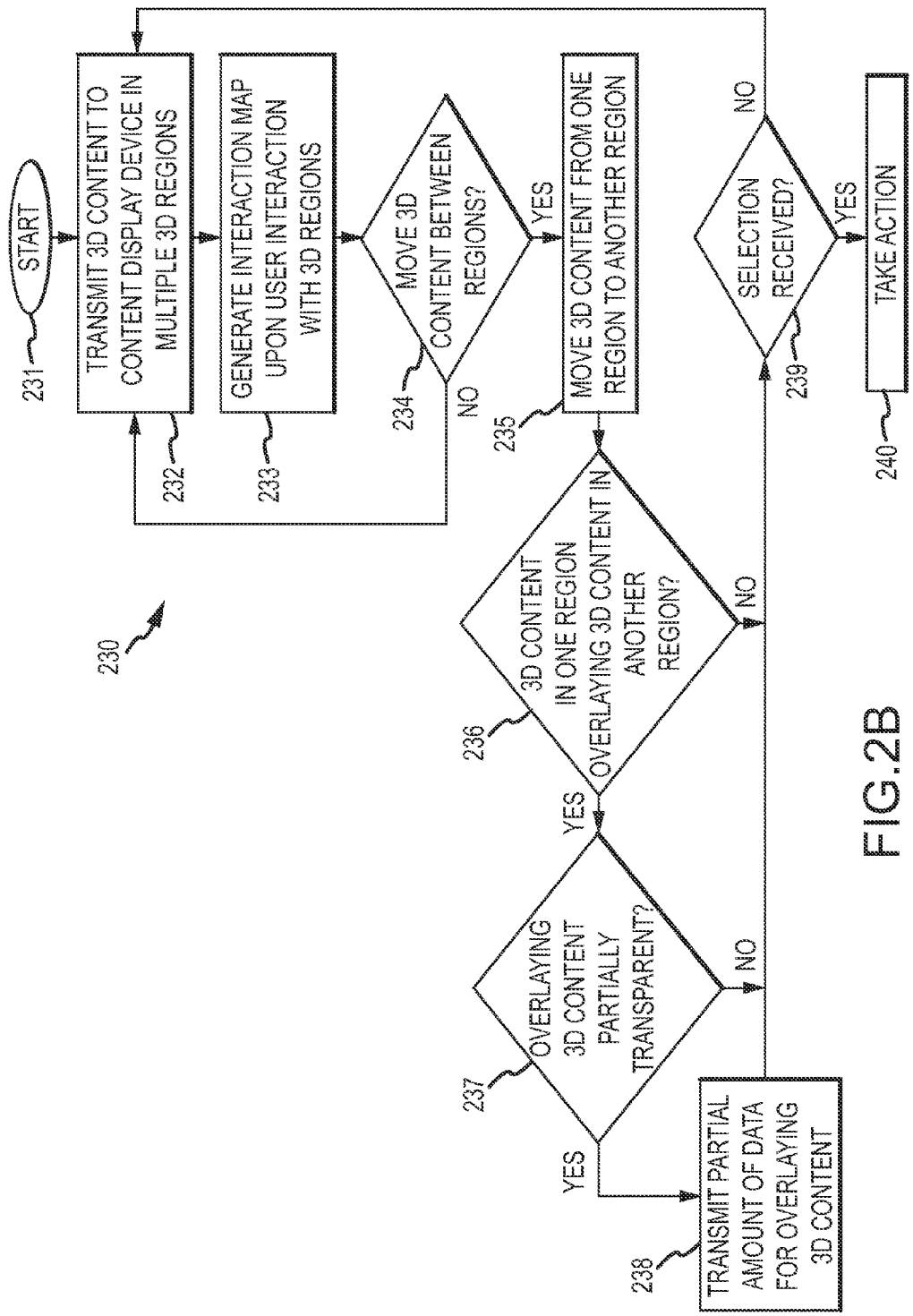

FIG. 2B illustrates a method 230 for transmitting a 3D display and receiving inputs to move 3D content from one region to another based on user selections. The method 230 may be performed by the system 100 of FIG. 1. The flow begins at block 231 and proceeds to block 232 where 3D content is transmitted to the content display device 106. The flow then optionally proceeds to block 203 where the processing unit 124 generates an interaction map upon user interaction with multiple 3D regions. The flow then proceeds to block 234 where the processing unit determines whether input has been received for moving 3D content between 3D regions. If not, the flow proceeds back to block 232. If input for moving 3D content between 3D regions has been received, the flow proceeds to block 235 where the 3D content moves to another region. The flow optionally proceeds to block 236 where the processing unit 124 determines whether 3D content in one region overlays 3D content in another region. If 3D content is overlaying other 3D content, the flow proceeds to block 237 where the processing unit 124 determines whether the overlaying 3D content should be transmitted as partially transparent. If so, the flow proceeds to block 238 where the processing unit 124 transmits a partial amount of data to cause the overlaying 3D content to be displayed as partially transparent. If 3D content between regions is not overlaying, or if the overlaying 3D content is not to be transmitted as partially transparent, or after the processing unit 124 transmits the partially transparent overlaying 3D content, the flow then optionally proceeds to block 239 where the content receiver 124 determines whether a selection has been received. If a selection has not been received, the flow proceeds to block 232 where 3D content is transmitted to the content display device 106. If a selection has been received, the flow proceeds to block 240 where the processing unit takes action.

The method 230 of FIG. 2B may enable the 3D content to be displayed in multiple regions or planes within the 3D region, such as a background 3D region, a middle 3D region, and a foreground 3D region. In one example, the method 230 may be utilized so that a 3D programming guide is displayed on a background 3D region while 3D video content is displayed on a 3D foreground region. All or a portion of the 3D video content may overlay the 3D programming guide, and the overlaying 3D video content may be partially transparent to enable viewing of the 3D programming guide in the 3D background region. In some implementations, both the underlying and overlaying 3D content may be partially transparent to enable the user to perceive the 3D content in each region. In some implementations, the one or more of the regions with 3D content may be transmitted so that the content is relatively dimmer compared to another region with 3D content, which may facilitate the viewer focusing on the relatively brighter 3D content. Furthermore, in some implementations, 3D content may be automatically changed from partially transparent to opaque and/or its brightness may be changed, in order to provide an indication (such as a notification) to the user.

The methods of FIGS. 2A and 2B may be utilized in combination to enable the user to move portions of their body to cause the sensor unit 180 of the sensor device 108 to sense movements and provide the movements as input to the processing unit 124. This enables the user to move the 3D content between regions and to make selections utilizing body movements.

Figure 3A:
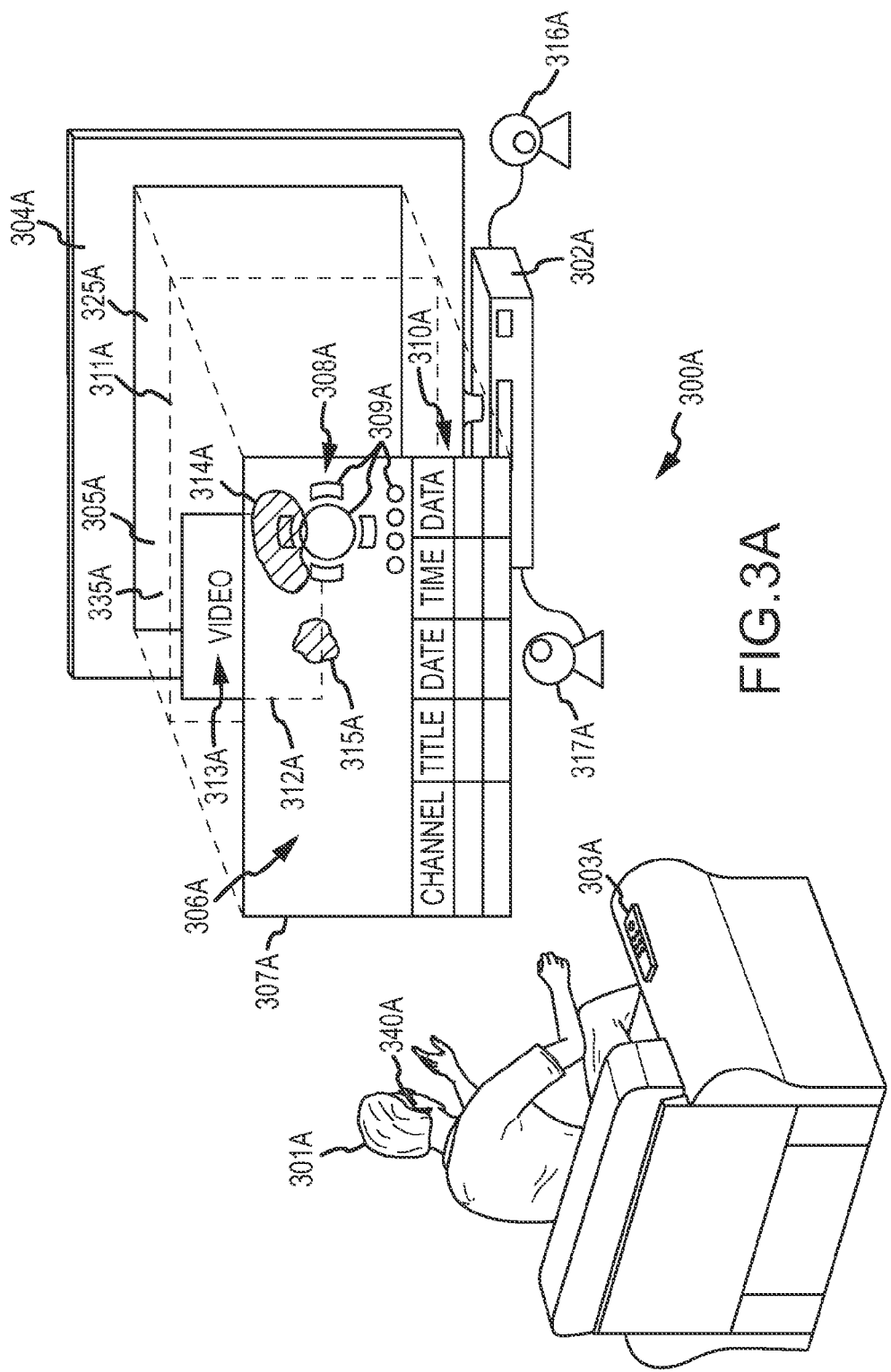

FIGS. 3A-3E illustrate a system 300A-300E for providing a 3D display that enables a user 301A to enter input into the content receiver 302A utilizing body movements or optionally utilizing a controller 303A. FIG. 3A shows the user 301A at the content display device 304A interacting with the content displayed on the display screen 305A utilizing their hands. The content is transmitted as 3D content 306A in a first virtual plane or region 307A, which includes a selection interface 308A with various selection icons 309A and a programming guide 310A. In a second virtual plane or region 311A, 3D content 306A including a video pane 312A displaying 3D video content 313A is shown. Accordingly, the 3D content 306A includes each of the selection interface 308A with various selection icons 309A, the programming guide 310A and the video pane 312A with the 3D video content 313A.

The user 301A may interact with portions of the 3D content 306A while simultaneously viewing the 3D video content 313A. In FIG. 3A, the 3D content 306A is transmitted in the different virtual planes or regions 307A and 311A, and the user interacts with the 3D content 306A utilizing virtual cursors 314A and 315A. In FIG. 3A, the user 301A interacts with the selection interface 308A utilizing cursor 314A arranged in the first virtual plane or region 307A and the 3D video pane 312A utilizing cursor 315A in the second virtual plane or region 311A. The sensors 316A and 317A, communicatively coupled to the content receiver 302A, sense the hand movements of the user 301A and transmit data to the content receiver 3012A in response to the sensed movements. As the user interacts with the virtual cursors 314A and 315A, the sensors 316A and 317A transmit data to the content receiver 302A, causing the content receiver 302A to take action, such as moving the cursors 314A, 315A over a portion of the 3D content 306A enabling the user to make selections associated with the 3D content 306A. It will be appreciated that the cursors 314A and 315A may be invisible and the portion of the 3D content 306A affected by the user's movements may move or shift to indicate that the user is interacting with the portion of the 3D content. In response to the movements of the user 301A, the 3D content may be moved; the size of the 3D content may be expanded or reduced; the 3D content may be removed from the display screen 305A (and therefore the virtual planes or regions 307A, 311A); the 3D content may be moved between virtual planes or regions 307A, 311A; and/or programming selections may be entered such as changing the channel, entering a recording selection, viewing programming event details, and so on.

Figure 3B:
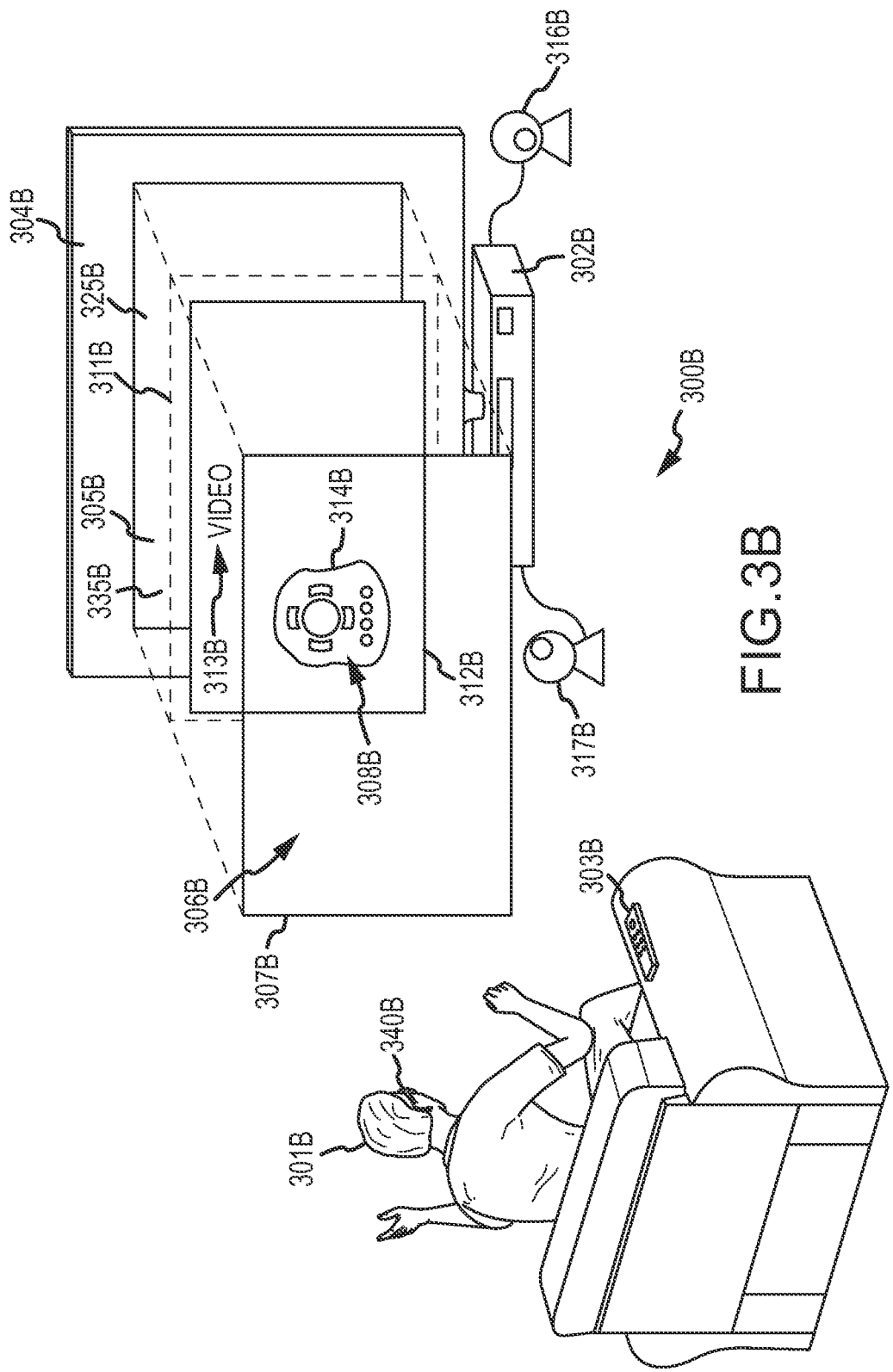

Turning to FIG. 3B, in response to the hand movements of the user 301B, the sensors 316B and 317B transmit signals to the content receiver 302B, which causes the content receiver 302B to resize the 3D video content 313B in the 3D video pane 312B so that the 3D video content 313B in the 3D video pane 312B is approximately the size of the virtual plane or region 311B. The content receiver 302B also moves the selection interface 308B to a different portion of the virtual plane or region 307B and resizes the selection interface 308B. The programming guide 310B is not transmitted to the content display device 304B by the content receiver 302B. In FIG. 3B, the cursor 314B overlies the selection interface 308B, which enables the user to enter selections utilizing the selection interface 308A. In some implementations, the selection interface 308B is transmitted as a partially transparent selection interface that enables the user 301B to view the underlying 3D video content 313B.

Figure 3C:
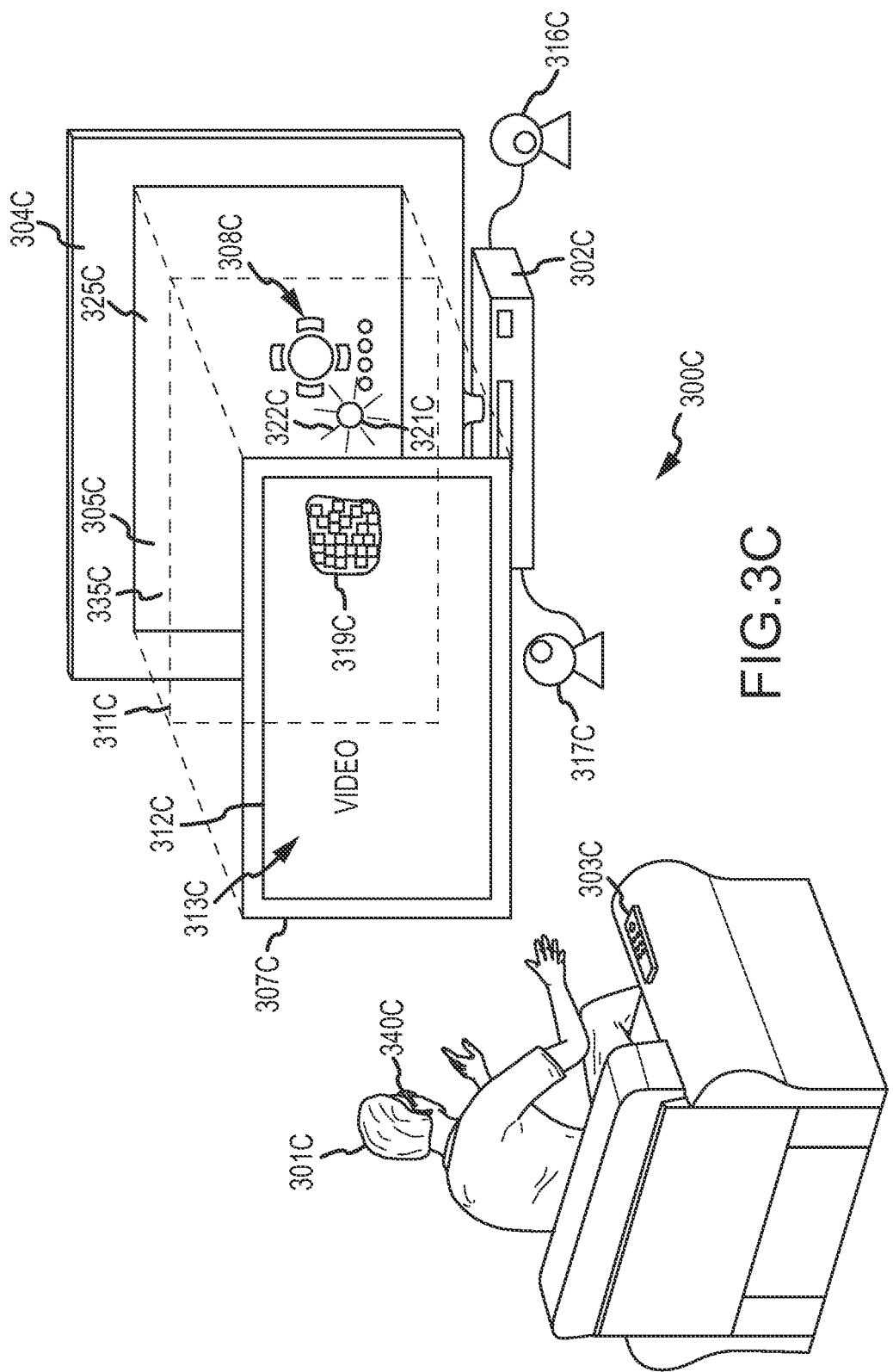

Turning to FIG. 3C, in response to the hand movements of the user 301C, the content receiver transmits the 3D video content 313C in the 3D video pane 312C so that each moves to the first virtual plane or region 307C. The content receiver 302C transmits the selection interface 308C so that it is moved to the second virtual plane or region 311C and to a different portion within the second virtual plane or region 311C. In FIG. 3C, the 3D video content 313C covers approximately the entire first virtual plane or region 307C so that the 3D video content 313C overlays the selection interface 308C in the second virtual plane or region 311C. The overlaying portion 319C of the 3D video content 313C is partially transparent so that the selection interface 308C is visible through the overlaying portion 319C. In some implementations, the underlying selection interface 308C may be shaded relatively darker compared to the 3D video content 314C so that the user 301C is not distracted by the underlying 3D content. In some implementations, a 3D indicator icon 321C may be displayed in the second virtual plane or region 311C. The 3D indicator icon 321C may be configured to switch from a darker shaded color to a bright color or from a partially transparent state to an opaque state, for example, for purposes of visually signaling to the user 301C that a selection may be entered for the user 301C to view data. In FIG. 3C, the 3D indicator icon 321C is configured as an opaque icon 322C for a signaling.

Turning to FIG. 3D, in response to the user selecting the indicator icon 321D, a 3D social media pane 323D with 3D social media content 324D is transmitted to the first virtual pane or region 307D. The 3D video pane 312C and 3D video content 313D associated therewith may be transmitted to the second virtual pane or region 311D, which may enable the user 301D to simultaneously view the 3D social media content 324D and the 3D video content 313D. While selecting the indicator icon 321C causes a 3D social media pane 323D to be transmitted in FIG. 3D, it will be appreciated that the 3D indicator icon 321D may be associated with a menu of items enabling the user to select the 3D content for viewing. The 3D indicator icon 321D or the associated menu may cause the display of 3D data such as social media (email, social networking websites), breaking news content, internet sites (such as news websites, blogs, and the like), a phone call, and so on. In FIG. 3D, the 3D indicator icon 321C may also be transmitted for display in the first virtual pane or region 307D, and the selection interface 308D may be transmitted as 2D content in the 2D viewing region 325D of the display screen 305D.

Turning to FIG. 3E, the sensors 316E and 317E may be communicatively coupled to the content receiver 302E and may sense user 301E movements in order to generate a an interaction map. The sensors 316E and 317E may be or form a portion of the sensor unit 180. Based on the sensed movements, the processing unit 124 of the content receiver 302E relates the sensed information to an area in which the user 302E perceives the position of certain 3D images and generates an interaction map. In FIG. 3E, the user 301E is prompted to touch certain portions of the 3D virtual planes or regions 307E and 311E. The user virtually touches a first 3D reference image 330E within the first virtual plane 307E, a second 3D reference image 331E within the second virtual plane 311E, and optionally a 2D reference image 332E associated with the viewing region 325E of the display screen 305E. The sensors 316E and 317E sense the body positions of the user 301E and using the sensed input, the content receiver 302E generates the interaction map. The user 301A-301E may then interact with the 3D content 306A-306D and/or 2D content 335A-335D in the manner described above in connection with FIGS. 3A-3D.

While two sensors 316E and 317E are provided for sensing user movements, more or less sensors may be used in connection with the system 300E. The sensors may be directed offset relative to each other so that each sensor senses a different space or region proximate the content display device 304E. This may enable the sensors to detect movement through three-dimensional space. The sensors 316E and 317E may thus be utilized to determine the user's 301E position relative to the sensors 316E and 317E for mapping. The sensors 316E and 317E may also be utilized to determine the user's 301E position relative to the content display device 304E. This data may be utilized by the content receiver 302E for generating the varying degrees of offset for the 3D content to be transmitted in the different 3D regions.

The user 301A-301E may interact with the 3D content 306A-306E in order to cause the 3D content 306A-306E to move forward or backward between virtual planes or regions 307A-307E and 311A-311E, or may cause the 3D content to move within the same virtual plane or region (such as within virtual plane or region 307A) to a different position. In FIG. 3A, the user 301A utilizes their hands to move a 3D cursor 314A within the first virtual plane or region 307A, and the user may move their hands to change the size of the cursor 314A, which may appear as a box or as an irregularly shaped region within the virtual plane or region 307A. In FIG. 3A, the 3D cursor encompasses a portion of the selection interface 308C, while in FIG. 3B, in response to the user 301B hand movements, the cursors 314B encompasses the entire selection interface 308C, thereby causing the selection interface 308C to move its position within the first virtual plane or region 307B. In some implementations, the user 301A-301E uses various hand gestured shown in FIGS. 3A-3E for causing the 3D content 306A-306E to change, such as to resize, move, and/or disappear from the viewing region (e.g., move out of the viewing region). In this case, the user may be prompted to interact with the virtual planes to enable the content receiver 302A-302E to generate an interaction map configured to recognize certain movements or combinations of movements for causing the 3D images to be resized and/or moved.

In some implementations, the 3D content 306A-306E may be configured to appear as though it is slightly moving or reacting to the user 301A-301E virtually touching a portion of the 3D content 306A-306E. A distance forward or backward the user moves their hand or other body portion may cause the 3D content 306A-306E to move forward or backward by a corresponding distance. In some implementations, a forward or backward movement may cause the 3D content 306A-306E to move between virtual planes 307A-307E and 311A-311E and/or to the 2D viewing region 325A-325E.

In the present disclosure, the various implementations are provided in the context of viewing 3D and 2D content on a 3D content display device communicatively coupled to a content receiver. Generally, 3D content is viewed by the user 301A-301E utilizing 3D glasses 340A-340E such as active or passive glasses. In some implementations, the content display device 304A-304E may be configured to enable the user to view the 3D content without the need to use the 3D glasses 340A-340E.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for providing a dynamically configurable three-dimensional display utilizing a content receiver, the method comprising:
    utilizing a content receiver to generate three-dimensional content, the three-dimensional content comprising a first set of three-dimensional content comprising a first offset and a second set of three-dimensional content comprising a second offset different from the first offset;
    utilizing the content receiver to transmit the three-dimensional content for display at a content display device such that the first set of three-dimensional content is perceived as being within a first three-dimensional region having an associated first perceived depth and the second set of three-dimensional content is perceived as being within a second three-dimensional region having an associated second perceived depth;
    generating an interaction map based upon at least one sensed body position of a user of the content receiver, the sensed body position corresponding to at least one displayed reference image, the interaction map enabling the user to interact with the three-dimensional content;
    receiving command signals at the content receiver to modify at least one of the first set and the second set of three-dimensional content;
    utilizing the content receiver to transmit at least one of the sets of three-dimensional content to the content display device such that at least one of the offsets is modified thereby changing the three-dimensional region in which one of the sets of three-dimensional content is perceived, wherein the at least one of the offsets is modified based upon the interaction map.

2. The method of claim 1, wherein the modified offset transmitted by the content receiver comprises modifying the first set of three-dimensional content to include the second offset such that the first set of three-dimensional content is perceived as being arranged in the second three-dimensional region.

3. The method of claim 2, wherein in response to receiving the command signal, the changed offset causes the first set of three-dimensional content and the second set of three-dimensional content to be transmitted by the content receiver such that each is perceived as being arranged in the second three-dimensional region.

4. The method of claim 2, wherein the changed offset transmitted by the content receiver comprises changing the second set of three-dimensional content to include the first offset such that the second set of three-dimensional content is perceived as being arranged in the first three-dimensional region.

5. The method of claim 1, wherein the command signals comprise sensed input from a sensor configured to sense user movements.

6. The method of claim 1, wherein the three-dimensional content transmitted by the content receiver in at least one of the first and second regions overlays the three-dimensional content of the other of the first and second regions.

7. The method of claim 6, wherein at least a portion of the overlaying three-dimensional content is transmitted by the content receiver as partially transparent three-dimensional content such that underlying content is perceived behind the partially transparent three-dimensional content.

8. The method of claim 1, further comprising utilizing the content receiver to transmit at least one of the first set of three-dimensional content and the second set of three-dimensional content as a three-dimensional user interface, the three-dimensional user interface configured to enable the content receiver to receive user selections in response to sensed input from a sensor configured to sense user movements corresponding to interactions with the three-dimensional user interface.

9. The method of claim 8, wherein the content receiver transmits the three-dimensional user interface as partially transparent three-dimensional content such that underlying content is perceived behind the partially transparent three-dimensional content.

10. A system for utilizing a content receiver to provide a dynamically configurable three-dimensional display, comprising:
    a processing unit configured to generate three-dimensional content, the three dimensional content comprising a first set of three-dimensional content comprising a first offset, the processing unit further configured to generate an interaction map based upon at least one sensed body position of a user of the content receiver, the sensed body position corresponding to at least one displayed reference image, the interaction map enabling the user to interact with the three-dimensional content;

a communications unit for transmitting the three-dimensional content for display at a content display device such that the first set of three-dimensional content is perceived as being within a first three-dimensional region having an associated first perceived depth;

wherein the communications unit is configured to receive command signals from a sensor device communicatively coupled to content receiver, the sensor device sensing user movements and transmitting data corresponding to command signals to the communications unit, wherein the processing unit modifies the first set of three-dimensional content in response to the command signals and based upon the interaction map such that the processing unit configures the first set of three-dimensional content with a second offset different from the first offset, and the communications unit transmits the first set of three-dimensional content such that the first set of three-dimensional content is perceived as being within a second three-dimensional region having an associated second perceived depth that is different from the first three-dimensional region having the first perceived depth, wherein at least one of the first offset or the second offset is modified based upon the interaction map.

11. The system of claim 10, wherein the processing unit is configured to generate a second set of three-dimensional content comprising a second offset different from the first offset, and the communications unit transmits the second set of three-dimensional content such that the second set of three-dimensional content is perceived as being within the second three-dimensional region.

12. The system of claim 11, wherein in response to the communications unit receiving command signals from the sensor device, the processing unit configures the second set of three-dimensional content with the first offset such that the second set of three-dimensional content is perceived as being within the first three-dimensional region.

13. The system of claim 12, wherein the three-dimensional content in at least one of the first and second three-dimensional regions, transmitted by the communications unit, overlays the three-dimensional content in the other of the other of the first and second three-dimensional regions.

14. The system of claim 13, wherein the processing unit configures at least a portion of the overlaying three-dimensional content as partially transparent three-dimensional content such upon the communications unit transmitting the three-dimensional content in the first and second three-dimensional regions, three-dimensional content underlying the overlying three-dimensional content is perceived behind the partially transparent overlaying three-dimensional content.

15. The system of claim 11, wherein at least one of the sets of three-dimensional content is configured as an indicator icon, the indicator icon comprising a first partially transparent state and a second opaque state for visually signaling to the user upon transitioning between states.

16. The system of claim 10, wherein the processing unit configures the first set of three-dimensional content as a three-dimensional user interface configured to enable the processing unit to receive user selections in response to the user interacting with the three-dimensional user interface, and wherein the user interactions are sensed by the sensor device.

17. The system of claim 16, wherein the processing unit is configured to generate a second set of three-dimensional content comprising an offset different from the offset of the three-dimensional user interface such that the second set of content is perceived as underlying the three-dimensional user interface.

18. The system of claim 17, wherein the content receiver transmits the three-dimensional user interface as partially transparent three-dimensional content such that underlying three-dimensional content is perceived behind the partially transparent three-dimensional content.

19. A computer program product comprising:

a first set of instructions, stored in at least one non-transitory machine readable medium, executable by at least one processing unit to generate three-dimensional content, the three-dimensional content comprising a first set of three-dimensional content comprising a first offset; and a second set of instructions, stored in the at least one non-transitory machine readable medium, executable by the at least one processing unit to cause the transmission of three-dimensional content for display at a content display device such that the first set of three-dimensional content is perceived by a user as being within a first three-dimensional region having an associated first perceived depth;

a third set of instructions, stored in the at least one non-transitory machine readable medium, executable by the at least one processing unit to generate an interaction map based upon at least one sensed body position of the user of the processing device, the sensed body position corresponding to at least one displayed reference image, the interaction map enabling the user to interact with the three dimensional content;

a fourth set of instructions, stored in the at least one non-transitory machine readable medium, executable by the at least one processing unit for modifying the first set of three-dimensional content in response to receiving command signals from a sensor device that senses user movements, wherein modifying the first set of three-dimensional content is based upon the interaction map and comprises configuring the first set of three-dimensional with a second offset different from the first offset, such that the first set of three-dimensional content is perceived as being within a second three-dimensional region having an associated second perceived depth that is different from the first three-dimensional region having the first perceived depth, wherein at least one of the first offset or the second offset is modified based on the interaction map.

20. The computer program product of claim 19, wherein the first set of instructions generates the first set of three-dimensional content as a three-dimensional user interface, and wherein the computer program product further comprises a fifth set of instructions, stored in the at least one non-transitory machine readable medium, executable by the at least one processing unit for receiving user selections based on the user utilizing the three-dimensional user interface.

* * * * *